United States Patent [19]

Bannon et al.

[11] 4,334,309

[45] Jun. 8, 1982

[54] ERROR CORRECTING CODE SYSTEM

[75] Inventors: Robert D. Bannon; Mahendra M. Bhansali, both of Boca Raton, Fla.

[73] Assignee: International Business Machines Corporation, Armonk, N.Y.

[21] Appl. No.: 164,397

[22] Filed: Jun. 30, 1980

[51] Int. Cl.³ ............................................. G06F 11/10
[52] U.S. Cl. ....................................... 371/38; 371/37
[58] Field of Search .................. 371/38, 37; 364/200, 364/900

[56] References Cited

U.S. PATENT DOCUMENTS

| | | | |
|---|---|---|---|
| 3,982,226 | 9/1976 | Bunker et al. | 371/38 |
| 3,988,580 | 10/1976 | Warman et al. | 371/38 |
| 4,031,374 | 6/1977 | Groudan et al. | 371/38 |

OTHER PUBLICATIONS

Conzola and Tung, Error Correction Without Speed Degradation, IBM Technical Disclosure Bulletin, vol. 10, No. 8, Jan. 1968, pp. 1275-1276.

Primary Examiner—Charles E. Atkinson
Attorney, Agent, or Firm—Sughrue, Mion, Zinn, Macpeak & Seas

[57] ABSTRACT

An error correcting code mechanism for SEC-DED (16, 21) or (8, 12) code to correct data bit errors caused by alpha particle impingement into high density storage units. The data word is read into and out of a high density storage unit and generated check bits are stored in low density storage immune to alpha particle radiation. Data bits and check bits, addressed in parallel are read out to error detecting and correcting circuits to determine the existence of an error only in a data bit and correct the state of the erroneous bit. The number of check bits and required parity and checking circuitry is reduced since no error checking of check bits, presumed to always be correct because of the use of low density storage occurs.

12 Claims, 8 Drawing Figures

FIG 6 H-MATRIX

FIG 8  H-MATRIX

ERROR CORRECTING CODE SYSTEM

TECHNICAL FIELD

This invention relates to an error-correcting code system for use with high density read/write data storage units. In particular, this system relates to a single error correction-double error detection (SEC-DED) mechanism correcting a single erroneous bit in a data word and providing a signal if there are two erroneous bits. The present invention finds particular utility in high density integrated circuits storage arrays. Such arrays, using integrated circuits storage chips are susceptible to errors caused by impingement of atomic alpha particles present in ordinary background atomic radiation. When such cells are struck by atomic alpha particles, the binary value stored in a cell may flip to an opposite value thereby inducing an "alpha particle error."

Because high density storage units are desirable in terms of cost and space savings, the solution to alpha particle errors is the use of error correcting code mechanisms. The present invention minimizes storage and circuit requirements while achieving SEC-DED.

BACKGROUND OF THE INVENTION

The prior art is replete with a number of error correcting code mechanisms. The codes are generally known as "hamming" codes in recognition of their early definition by R. P. Hamming of Bell Labs in the late 1940s. Such basic codes are described in "Error Detecting and Error Correcting Codes," Bell System Technical Journal, pp. 140-147, April 1950, and an example appears in the Ralston and Meek Encyclopedia of Computer Science, pp. 547-548.

An error correcting code is the data representation allowing for error detection and correction if the detected error is of a specific type. A common type of approach, shown in FIGS. 1 and 2 employs a data word using a code of seven binary digits. When the data word is correctly coded it will have a unique representation but changing any bit will produce a different and unacceptable coded character. Accordingly, in the case of a seven binary digit word there is a possibility of seven unacceptable characters relating to any single correctly coded character. During storage if any bit is changed, an error results. During reading of the word, detection of the error occurs by the use of a plurality of parity check bits generated for each multiple bit data word. These parity bits are written into storage together with the data word. FIG. 1 shows generally how such a data word together with parity check bits are used in assembling a so-called "H-Matrix."

As shown in FIG. 1, the seven binary digit word is divided into three check bits and four data bits. The "1" marks in a given horizontal row indicate bits which are checked by a particular parity bit. In FIG. 1, the first row parity check 1 is assigned for the 3, 5, and 7 data bits, second row parity check 2 for 3, 6 and 7 data bits and third row parity check 4 for the 5, 6, and 7 data bits. In the matrix, the binary sum of any check bits is indicative of the particular data bit. For example, an error occurring at the fifth bit would be subject to a parity check of bits 1 and 4, an error at the seventh bit would be subject to a parity check of bits 1, 2 and 4. As a result, the parity checks are given an appropriate weighting factor as shown in FIG. 1 and then by means of parity check circuits the truth table as shown in FIG. 2 can be used to determine the exact storage output bit error.

For example, if the output bit 6 is in error, parity check circuit 1 will indicate no error while parity checks 2 and 3 having weights 2 and 4 will indicate that the 6 bit is in error.

FIGS. 3 and 4 show a hardware implementation for the H-matrix of the FIG. 1. This hardware implementation also conforms to the Hamming code shown on page 548 of the "Encyclopedia of Computer Science" article identified above. As indicated, it is necessary to provide three check bits for a four-bit data character to achieve a single bit error correction operation. As shown in the H-matrix of FIG. 1 seven bits are stored for each data word. In FIG. 3, the seven bit storage element utilizes two inputs, the first being the four-bit data character comprising bit positions 3, 5, 6, and 7 and three check bits occupying bit positions 1, 2 and 4. The check bits, that is, bit 1, bit 2 and bit 4 are derived utilizing parity generators coupled logically in accordance the H-Matrix to respective bit channels of a bus carrying the four-bit data character. The generated check bits are then fed to the read-in side of the storage module.

On the read-out side, three parity check circuits are selectively coupled as shown to the seven bit data character to generate a three-bit binary code representative of the location or number of the storage unit output bit position which has produced an error. A decoder receives these three "syndrome bits" to activate one of seven possible output lines. That is, the decoder produces an output corresponding to the truth table of FIG. 4 upon receiving the three syndrome bits to indicate the error position. An error corrector, generally Exclusive OR circuits, receives the decoder output and each of the seven bits from storage. If, for example, a decoder output line has a "Zero" value, the corresponding Exclusive OR circuit will pass the storage output bit at that position in an unmodified value. If, however, the decoder output line has a "1" value, then the Exclusive OR circuit will invert the binary value of the storage bit passing through that circuit and, thereby, correct the error. In such systems it is apparent that only one of the decoder output lines will carry the "1" level at any one time, that is, corresponding to one erroneous bit position. That particular signal on the output line is used to correct the erroneous storage output bit by inversion to the opposite binary value.

Both check bits as well data error bits are corrected, however, if more than one bit is in error the mechanism fails. The system shown in FIG. 3 is known as a single error correction (SEC) system. These systems are used to correct data words which have only a single bit in error and multiple errors are beyond the capacity of such systems. A hallmark of such systems is the correspondence between parity checking circuits and parity generating circuit. For example, the parity generating circuit responsive to the first bit utilizes data bits 3, 5 and 7. The parity check circuit utilizes the same data bits, 3, 5 and 7 in addition to the first check bit (Bit 1). The same relationship exists for parity check circuit 2 in relationship to the bit 2 in parity check circuit 3 with respect to parity check bit 4.

An extension of the SEC system is an error-correcting code which will detect double errors, that is, a pair of erroneous bits in a single word and provide a signal indicative of that multiple error. Such systems are known in the prior art as a single error correction-double error detection (SEC-DED) systems.

Referring to FIGS. 5 and 6, a prior art system of this type is shown. FIGS. 5 and 6 correspond to the error-correcting code described in Hsiao, "A Class of Optimal Minimum Odd-Weight-Column SEC-DED Codes," I.B.M. Journal of Research and Development, July 1970, pp. 395–401. This SEC-DED system, a contemporary prior art technique, utilizes sixteen data bits and six check bits so that the total number of bits written into and ultimately read from the storage unit is a twenty-two bit word. As recognized in Hsiao, the generation of the H-Matrix shown in FIG. 6 follows specific criteria. The H-Matrix is a code having minimum weight w so that if every combination of w-1 or fewer columns of the matrix is linearly independent. The minimum weight requirement is recognized in the prior art as 4 thereby requiring that three or fewer columns of the H-matrix be linearly independent.

In the construction of the code shown in FIG. 6, three general constraints are imposed: (1) each column has an odd number of ones, that is, all column vectors are of odd weight, (2) the total number of ones in the H-matrix should be minimized and (3) the number of ones in each row of the matrix should be equal or as close as possible to the average number, that is, the total number of ones in the matrix divided by the number of rows. The H-matrix of FIG. 6, satisfying these constraints, utilizes six columns corresponding to the six possible combinations of one out of six and sixteen columns corresponding to sixteen of the twenty possible combinations of three out of six parity checks. By inspection, it can be seen that the total number of ones in the H-matrix is equal to three ones for each of sixteen columns plus six check pits equaling fifty-four ones. The average number of ones in each row is fifty-four divided by six or nine ones. Accordingly, in constructing a detection system for this H-Matrix a three-way Exclusive-OR gate can be used with a check and syndrome bits generated in two levels.

As shown in FIG. 5, the data word comprises sixteen data bits. In accordance with conventional practice the /16 indicates the number of bit lines in that data bus. The data word is supplied to a check bit generator comprising, in accordance with the Hsiao teaching, nineteen three-way Exclusive-OR circuits. The generator output comprises six check bits combined with the sixteen bit data word to form a twenty-two bit data word fed into storage. On the read out side, the twenty-two bit word, in a manner comparable with FIG. 3 is fed to a syndrome bit generator to perform the six parity checks. The six parity check circuits are comparable to the three parity check system shown in FIG. 1, that is, each system utilizing one parity check circuit for each check bit.

In accordance with Hsiao, in addition to single error correction, utilizing the decoder and error corrector as shown in FIG. 5, double error detection takes place. Double-error detection is accomplished by examining the overall parity of all syndrome bits generated by the syndrome bit generator. That is, the syndrome bit generator will generate an output to the decoder for purposes of correcting a single detected output error. Checking occurs by determining whether an even number of syndrome bits is generated thereby indicating an even number of errors. Because the errors are assumed to be statistically independent, multiple even errors are treated as though a double error has been sensed. Double error detection as shown in FIGS. 5 and 6 is different from the Hamming code as shown in FIGS. 1–4 since, a special bit, namely a fourth check bit together with a fourth parity checking circuit would be needed to realize an all-one row in the H-Matrix to determine whether a single (odd) or double (even) error has occurred.

Although the FIG. 5 circuit utilizes a separate circuitry for the check bit generator and syndrome bit generator, the prior art perceives that the same set of 19 Exclusive OR (EOR) circuits can be used to provide both the check bit generation and syndrome bit generation function. In this situation the check bit inputs $C_1$–$C_6$ would be omitted when writing to storage but would be included in the syndrome bit generation phase. If such a system were utilized a switching circuit would be needed to switch the EOR circuits from a storage writing operation to a storage reading operation and therefore, from a practical standpoint the prior art generally uses separate circuitry.

Additionally, as shown in FIG. 6, the 6-bit code produced by the syndrome bit generator does not have the binary 8-4-2-1 weighting relationship relative to the bit number or position number of the erroneous storage output unit bit. However, as shown, for each of the sixteen data bit positions there is a discrete 6-bit code value for each different possible erroneous bit location. Accordingly, the decoder utilizing 22 AND circuits is correct so long as the 22 decoder output lines are correctly coupled to the different Exclusive OR circuits in the error corrector.

Although operative for SEC-DED, the prior art as shown in FIGS. 5 and 6 requires six check bits. Given the accepted use, high density storage and the corresponding requirement for an error-correcting code mechanism, the penalty for such additional circuits is fairly substantial. A system which reduces the number of check bits per word results in substantial savings in cost and number of circuits in the context of an overall system. For example, in a system utilizing 64K bytes (8 bits per byte) of storage, the elimination of one check bit saves 32K bits of storage.

In addition to Hsiao the prior art systems achieving SEC or SEC-DED are known. For example, U.S. Pat. No. 4,005,405 employs a modified Hamming using 5 check bits for a 26 bit data word to achieve SEC. However, double error detection is not perceived or employed in that system. U.S. Pat. No. 4,139,148 employs SEC-DED and divided a common RAM into separate data and check bit locations. The H-Matrix and hardware implementation used makes no attempt to minimize the number of check bits, using 7 check bits for 38 data bits. This patent follows the table in Hsiao (p. 397) for various code parameters. A second tier of prior art, considered less pertinent is also known. This includes U.S. Pat. Nos. 3,735,105; 3,949,208 and IBM Technical Disclosure Bulletins, Vol. 10, No. 10, pp. 1561–2; Vol. 15, No. 1, pp. 130–4; Vol. 20, No. 8, pp. 3187–8; Vol. 21, No. 10, pp. 4297–8; Vol. 22, No. 4, pp. 1607–13, and Vol. 22, No. 88, pp. 3833–4. These systems while showing a number of alternatives do not deal with the problem of alpha particle errors in high density storage units, nor do they attempt to minimize the number of check bits for a given data word yet still accomplish SEC-DED. Six check bits for a sixteen bit data word have been required in all known operative systems working in this mode.

SUMMARY OF THE INVENTION

Contemporary data processing systems utilize such integrated circuits storage chips each containing about 128K bits, or more, of storage capacity. Such high density storage units provide increased data processing storage capacity in less space and can be produced very economically in terms of cost per bit of storage. Given the continued growing use of such storage systems, an associated problem, induced data errors have resulted, necessitating the use of error code mechanisms. Using high density data storage tends to result in the occurrence of "soft" (non-permanent) errors when background radiation alpha particles impinge the storage cells causing the binary values stored therein to flip to an opposite value.

"soft" errors are a function of cell size of the storage area which in turn determines the capacitance/unit area, that is the critical charge of a bit of stored data. Generally the cell size in high density storage is in the order of $134.75^2$ microns and low density storage about three times larger. In low density units, given the larger cell size, more charge per unit area can be stored so alpha particles containing about $2 \times 10^6$ electrons cannot "flip" a stored binary valve. However, in high density cells storing a charge in the range of $1.2 \times 10^6$ electrons, alpha particle errors may occur.

In accordance with the present invention, a novel error correcting code mechanism reduces the number of check bits and reduces to a minimal amount the required error-correcting circuitry. This invention perceives the use of two storage units, parity check bits stored in a low density storage unit which is addressed in parallel with the high density storage unit containing data bits. The system proceeds on the assumption that low-density storage is uneffected by alpha particle radiation and accordingly, the check bits read out from such storage are always correct. As a result, the error correcting code (ECC) is not required to check the validity of the check bits.

In the invention, for example, utilizing a 16-bit data word, high density storage is utilized for storage and retrieval of each discrete data word. A separate low density storage is used for the check bits produced by check bit generators. The two storage units are addressed in parallel so that any given set of five check bits is stored at the same address to the corresponding set of 16 data bits in the data word. In a storage readout operation the outputs of both the high and low density storage units are applied to the syndrome bit generator for generation of a 5-bit syndrome bit code in even parity. This code is decoded by a decoder to control an error detector and therefore correct the state an erroneous error bit from the high density storage unit. Since the check bits are presumed to be correct only the data bits are corrected. The system operates to achieve double error detection by examining the overall parity of all the syndrome bits.

For a better understanding of the present invention, together with other and further advantages and features thereof, reference is made to the following description taken in connection with the accompanying drawings, the scope of the invention being defined in the appended claims.

BRIEF DESCRIPTION OF THE DRAWINGS

Referring to the drawings:

FIG. 6 shows the H-matrix for the FIG. 5 system;

FIG. 8 shows the H-matrix for the FIG. 7 system in accordance with the present invention.

DESCRIPTION OF THE PREFERRED EMBODIMENTS

Figures 1, 2:
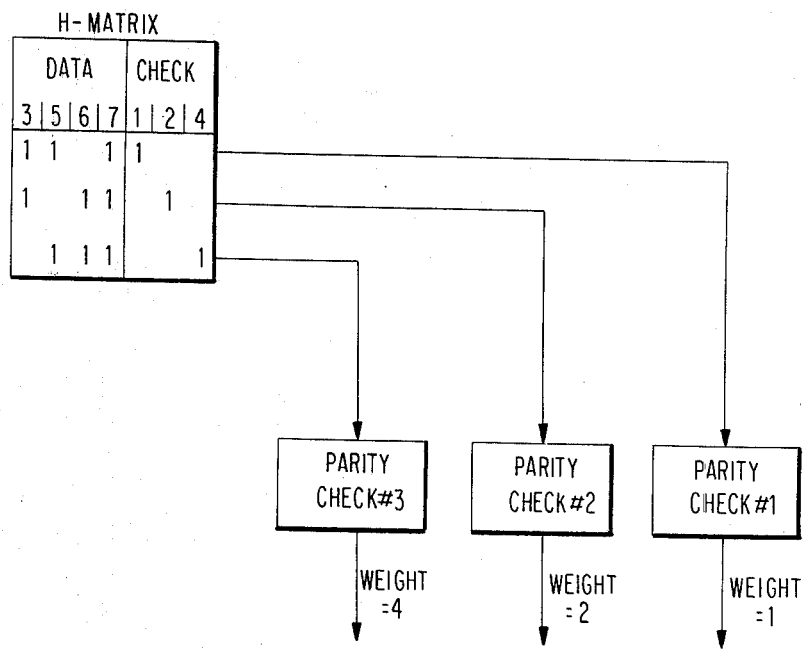
FIG. 1 shows a H-matrix for a Hamming-code.
FIG. 2 is a truth table showing the code and error position of the FIG. 1 H-matrix.
Figures 3, 4:
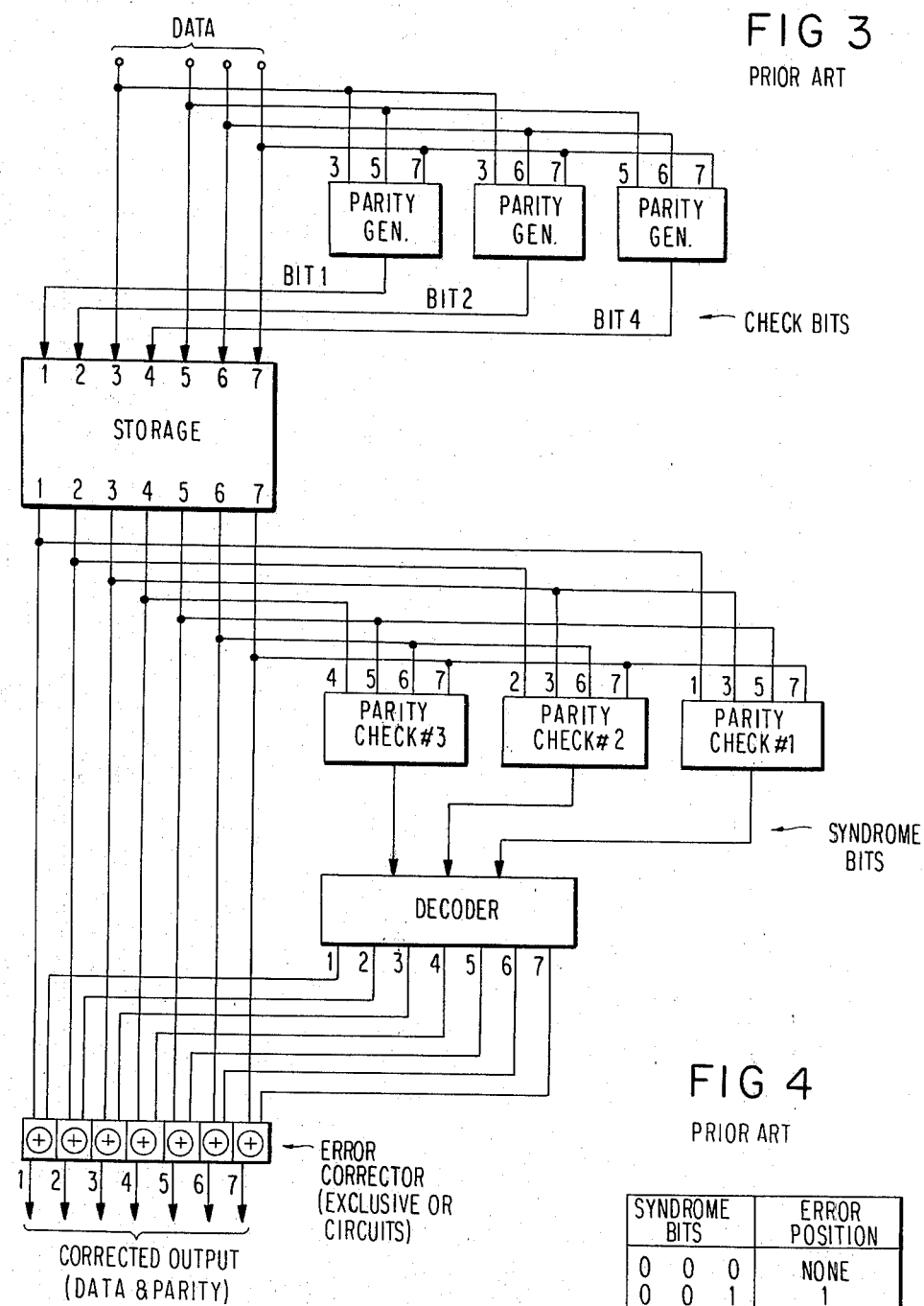
FIG. 3 shows a prior art Hamming Code error correction circuit.
FIG. 4 shows the truth table for the generation of syndrome bits and error position in correspondence with the FIG. 3 circuit.
Figure 5:
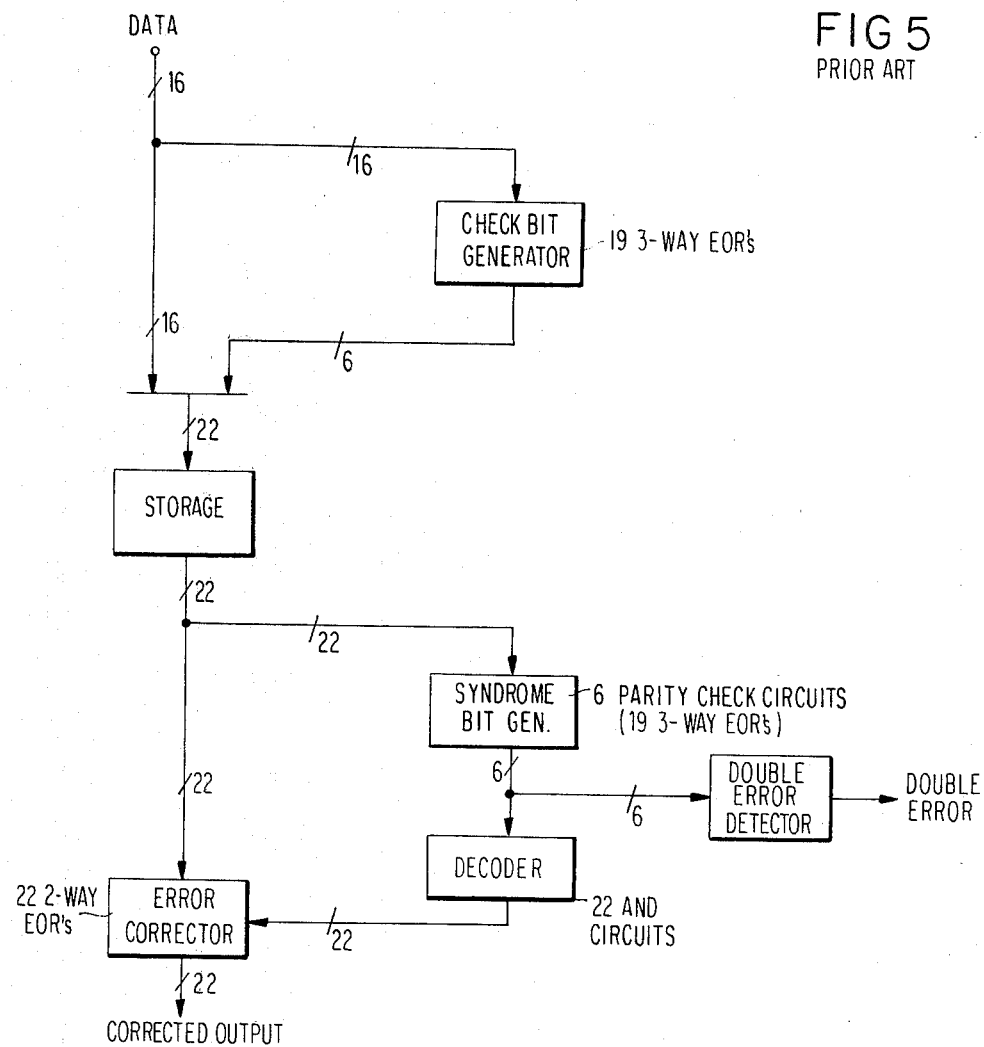
FIG. 5 shows a prior art SEC-DED system utilizing six check bits.
Figure 7:
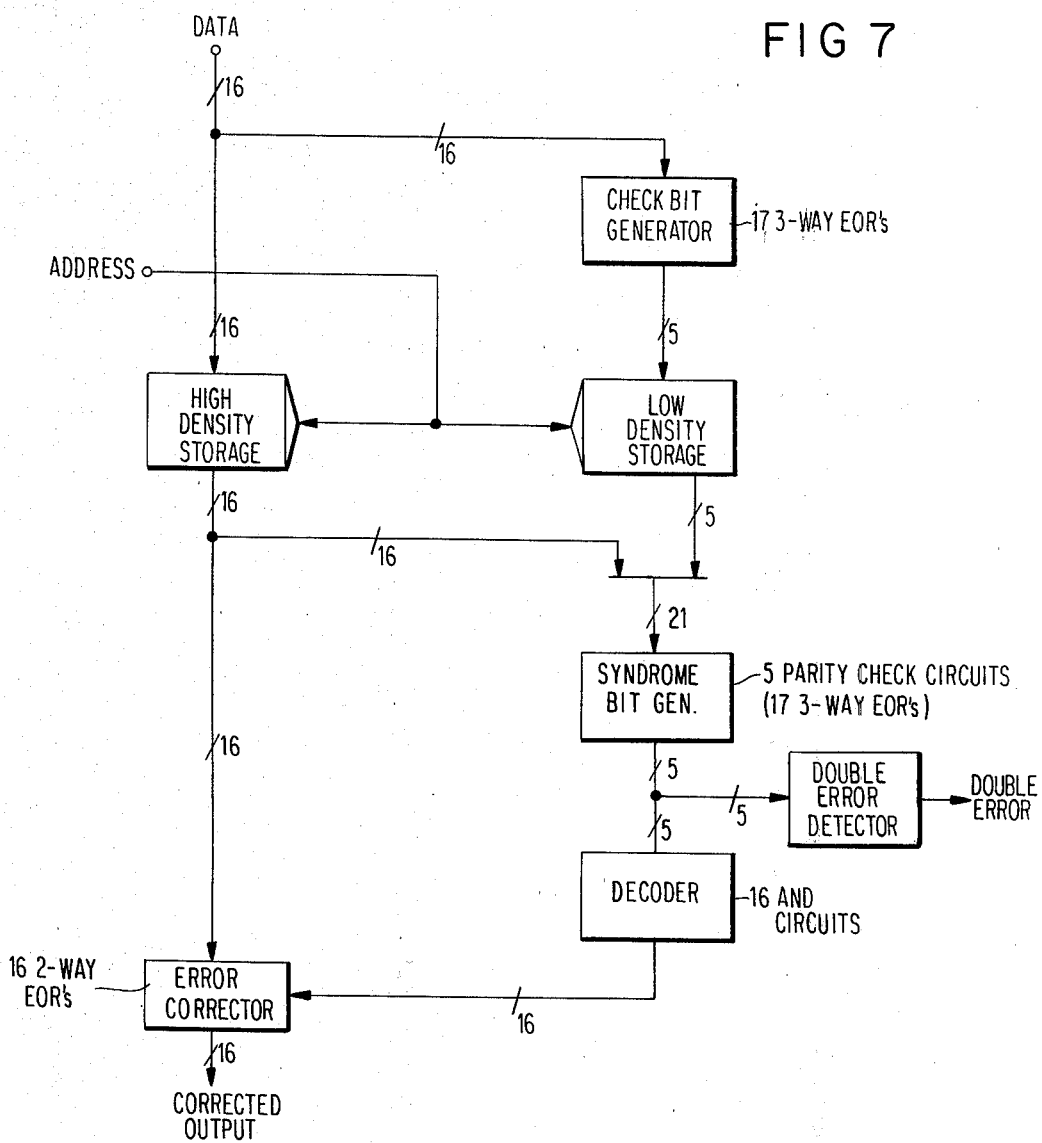
FIG. 7 shows the SEC-DED system of the present invention utilizing high and low density storage units.

Referring now to FIGS. 7 and 8, the first preferred embodiment of this invention is shown. In this embodiment, a sixteen bit data word is delivered to a high density storage unit typically two 128K bit chips. In accordance with convention, each of the 16 bits forming the data word is delivered along 16 parallel bit lines shown as the /16 bus. The 16-bit data words are therefore written into and subsequently read out of the high density storage unit, however, check bits which are generated are separately stored. Accordingly, as shown in FIG. 7, the 16-bit data word is delivered to a check bit generator to generate five check bits. If three way Exclusive-OR gates are utilized seventeen would be required. This is in contrast to the nineteen Exclusive-OR gates required in the prior art Hsiao system. The generated check bits are read into a low density storage unit. For example, a 32K X-5 module, impervious to alpha particle bombardment can be used. The two storage units are addressed in parallel as shown in FIG. 7 so that any set of five check bits generated by the check bit generator is stored at the same address with the corresponding set of 16 data bits.

During a storage readout operation, parallel outputs of both the high density storage and low density storage are delivered to the syndrome bit generator. The syndrome bit generator comprises five parity bit circuits to generate along a five bit line bus the five bit syndrome bit code to the decoder. Since only data bits are corrected, the decoder utilizes 16 AND circuits and not the 22 circuits required in the prior art systems. Check bits are not corrected.

Although shown as separate elements, the syndrome bit generator and the check bit generator may comprise the same elements with appropriate switching between operations. The output of the syndrome generator is transmitted along to the decoder along a five bit line and a second line to the double error detector. The double error detector may incorporate two parallel inputs, one a five-way OR gate array and the second two levels of EOR's. The OR output is indicative of a detected error and the respective outputs are fed to two two-way AND circuits with the exclusive OR output inverted prior to delivery to one of the two-way AND circuits. One two-way AND serves as SINGLE ERROR GATE deliverying a single signal to the decoder representing the presence of a single error. A double error is detected by the second AND gate receiving the inverted signal and the five-way OR output. Such a modification operates in the equivalent manner to that shown in FIG. 7.

As shown in FIG. 8, the H-matrix for this embodiment of the invention operates in even parity. This is shown by use of zeros in the check bits $C_1$–$C_5$ columns. The use of even parity eliminates the need for an inverter circuit required in an odd parity (Hsiao) system. A comparison of the H-matrix of FIG. 8 with that of FIG. 6 indicates that in accordance with the present invention only forty ones are utilized as compared with fifty-four ones in the prior art. Accordingly, the H-matrix of FIG. 8 satisfies the conventional restraints by having every column an odd number of ones so that each of the column vectors are of an odd weight, in the case of this matrix the bits per column having weights of 1, 3, and 5. Secondly, the total number of ones in the matrix is reduced, from 54 to 40 and thirdly, the number of ones in each row is equal, each row containing eight ones.

Although the preferred embodiment has been described and illustrated in the context of a sixteen bit data word, this invention is also applicable if the error correcting code is generated on a byte (8 bits) basis. In the prior art five check bits are still required for eight data bits. However, utilizing this invention the same function can be accomplished utilizing four check bits utilizing the H-matrix shown below. This matrix, like that of FIG. 8, utilizes even parity in the context of an 8-bit data word.

| 0 | 1 | 2 | 3 | 4 | 5 | 6 | 7 | $C_1$ | $C_2$ | $C_3$ | $C_4$ |
|---|---|---|---|---|---|---|---|---|---|---|---|
| 1 | 1 |   | 1 | 1 |   |   |   | 0 |   |   |   |
| 1 |   | 1 | 1 |   | 1 |   |   |   | 0 |   |   |
| 1 | 1 | 1 |   |   |   | 1 |   |   |   | 0 |   |
|   | 1 | 1 | 1 |   |   |   | 1 |   |   |   | 0 |

Utilizing the above H-matrix in the context of the FIG. 7 system, it is apparent that the 8-bit data word would be stored in the high density storage while the four check bits would be stored in low density storage. Accordingly, while FIG. 7 shows a 16 line data buses, if the system were used for an eight data bit word (one byte), the buses would have eight parallel lines. In the case of check bits four parallel lines would be used instead of five as shown. Moreover, because of the reduction in the length of the data word and number of check bits, the number of EOR's and the check bit generator and, syndrome bit generators in error corrector would be reduced as well as the number of AND circuits in the decoder. The system, however, would operate in the identical manner to that shown in FIG. 7.

As in the case of the FIG. 8 H-matrix, the H-matrix shown above satisfies the three system constraints required for such arrangements. Specifically, it is apparent that each column has an odd number of ones, the total number of ones in the matrix has been minimized and thirdly, that the number of ones in each row is equal or as close as possible to the average number per row. In the case of the H-matrix as shown above, the number of ones in each row is equal, each row having four ones.

By use of the present invention wherein two storage units are used, a high density storage for the data word, and a low density alpha particle impervious storage unit for the check bits, significant material improvements in the system costs result. When utilizing high density integrated circuit storage arrays, that is, where in each integrated circuit storage chip contains about 128K bits or more of storage capacity, such chips are as set forth susceptible to so-called "soft errors." These soft errors take place when alpha particle impinge the storage cells and because of the very small difference in electrical charges between the two binary states cause the value stored in an individual cell to flip to an opposite value. Alpha particle radiation is common in every day background radiation and cannot be eliminated environmentally within a data storage system without severe design problems. However, given the cost effectiveness of high density storage together with its inherent ability to provide mass storage in less space the use of such units has continued and is expanding.

Accordingly, the "soft error" problem will continue, mandating the use of error correcting code mechanisms as a necessary adjunct. The prior art systems have required additional circuits and the use of such error correcting codes has incurred a fairly substantial cost and storage penalty. In contrast, in the present invention, by reducing the number of check bits compared with those required by the best prior art technique, substantial savings in terms of cost and circuit count result. By simply reducing the number of check bits to one less than the best prior art technique a storage saving of 32K bits results for every 64K bytes of storage. Moreover, as indicated, additional savings occur because of the reduced circuit count in the check bit generator, syndrome bit generator, decoder and error corrector. By using even parity, inverter circuits are eliminated.

Apart from these apparent benefits of the present invention, another important advantage occurs in the manner in which such storage circuits are nominally packaged. Storage chips are generally provided with a storage width of either eight or nine bits. In the best prior art (Hsaio) technique, the twenty-two data and six check bits (16+6) requires a storage width of at least 22 bits. Utilizing standard 8-bit or 9-bit wide chips, this would require the use of memory chips in groups of three to store each 22 bit word. Hence, in the case of an 8-bit wide chip, 24 hardware bits per word are provided to store 22 data and check bits. Accordingly, there is a waste of two storage bits per word. In the case of 9-bit wide chips the waste is greater, five bits per word.

In the case of the present invention the low density storage for the check bits can comprise a 32K X-5 module that is generally impervious to alpha particle bombardment. The use of a five bit width chip therefore results in an immediate improvement in terms of storage of check bits in low density storage.

It is recognized that the use of low density storage chips incurs a cost penalty, since such chips cost approximately twice as much as high density chips on a per bit basis. This cost differential can be eliminated in the context of the present invention by using imperfect low density chips, that is, chips having some imperfections but still having usable memory cells to provide a five bit width. For example, by utilizing eight wide or nine wide low density chips, still having a usable five bit width, the cost of such chips will be about the same or even less than that for high density chips. Hence, in the case of mass production of storage chips where there are a large number of rejects, a use for some of those normally rejected chips can occur in the context of the present invention.

Therefore, it is apparent that by the use of the error correcting code mechanism utilizing a minimal number of check bits and reducing the size of error correcting circuitry, this invention provides material advantages over the prior art. Moreover, while the preferred embodiment and modifications of this invention have been described herein, it is apparent to those skilled in the art that various changes and modifications may be made without departing from the invention which is therefore intended to cover all such changes and modifications as fall within in the true spirit and scope herein.

We claim:

1. An error correcting code mechanism comprising:
a high density storage unit receiving a data word;
means responsive to said data word for generating a set of check bits;
a low density storage unit receiving said check bits; and
error detecting and correcting means receiving a data word from said high density storage unit together with a corresponding set of check bits from said low density storage unit for determining if an erroneous bit exists only in said data word and reversing the state of said erroneous bit.

2. An error correcting code mechanism for use with a high density storage unit for correcting data errors caused by alpha particle impingement comprising:
means for reading and writing data words into and out of a high density storage unit;
check bit generating means responsive to each data word being written into said high density storage unit and generating a set of check bits;
a low density storage unit receiving said check bits; and
error detecting and correcting means receiving a data word read out of said high density storage unit and a corresponding set of check bits from said low density storage unit for determining the existence of an erroneous bit only in said data word and reversing the state of said erroneous bit.

3. In an error-correcting code mechanism for use with a high density storage unit for correcting errors in data stored therein and having circuitry for reading and writing data words into and out of the high density storage units and error correcting circuitry for receiving each word of data read out and correcting the sense on erroneous bit of said word, the improvement comprising:
check bit generating means responsive to each word of data written into said high density storage for a generating set of check bits;
a low density storage unit receiving said check bits; and
error detecting means receiving a data word read out of said high density storage unit and a corresponding set of check bits from said low density storage unit for determining the existence of an erroneous bit only in said data word and producing an output to said error correcting circuitry to correct said erroneous bit.

4. An error-correcting code mechanism for use with high density data storage to correct alpha particle errors with a minimal number of check bits and a minimal amount of error-correcting circuitry comprising:
a high density storage unit having storage cells susceptible to having binary values stored therein flipped to the opposite value if the cell is struck by an atomic alpha particle present in background atomic radiation;
circuitry for writing data into and reading data out of the high density storage unit;
a low density storage unit having storage cells not normally affected by alpha particles;
check bit generating circuitry responsive to each word of data being written into the high density storage unit for generating a corresponding set of check bits and writing same into the low density storage unit;
error correcting circuitry for receiving each word of data read out of the high density storage unit; and
error-detecting circuitry for receiving each data word read out of the high density storage unit together with the corresponding set of check bits from the low density storage unit for determining the existence of an erroneous bit in the data word and for activating the error-correcting circuitry to correct the binary value of such erroneous bit 5. The error correcting code mechanism of claims 1, 2 or 3 wherein said low density storage is immune to alpha particle radiation bombardment.

6. The error code mechanism of claims 1, 2, 3 or 4 wherein said data word and said set of check bits are commonly addressed.

7. The error code mechanism of claims 1, 2, 3, or 4 further comprising means for detecting the occurrence of a multiple bit error in said data word.

8. The error code mechanism of claims 1, 2, 3 or 4 wherein said error detecting means comprises even parity check circuits, the number of check circuitry equal to the number of check bits, said parity check circuits producing an output indicative of the bit position of an erroneous bit in said data word.

9. The error code mechanism of claim 8 wherein said error detecting means further comprises decoder means receiving the output of said parity check circuits for logically combining said output and producing an output to change the state of said erroneous bit in said data word.

10. A method of detecting and correcting errors in a data word stored in a high density storage unit comprising the steps of:
reading said data word into a high density storage unit;
generating a set of check bits responsive to said data word in accordance with an error correcting code;
storing said check bits in a low density storage unit;
reading out a data word and a corresponding set of check bits into parity checking circuits equal in number to the number of check bits;
determining if a parity error exists in a data bit only in said data word;
generating a correction signal indicative of the bit position of said erroneous data bit; and
changing the state of said erroneous data bit.

11. The method of claim 10 further comprising the step of sensing whether a multiple parity error exists in said data word.

12. The method of claim 10 wherein the step of changing the sense of said erroneous data bit comprises the steps of reading said data word from said high density storage unit into an error corrector, receiving said correction signal in said error corrector and logically combining data bits of said data word with bits of said correction signal to derive and output dat words having the sense of said erroneous data bit changed.

* * * * *

UNITED STATES PATENT AND TRADEMARK OFFICE
CERTIFICATE OF CORRECTION

PATENT NO. : 4,334,309

DATED : June 8, 1982

INVENTOR(S) : Robert D. Bannon et al

It is certified that error appears in the above—identified patent and that said Letters Patent is hereby corrected as shown below:

On the title page

Abstract, line 11, change "parity and checking" to -- parity checking --.

Col. 3, line 35, change "pits" to -- bits --;

Col. 5, line 17, change "soft" to -- Soft --;

Col. 10, line 16, change "bit" to -- bit. --;

Col. 10, line 63, change "dat" to -- data --.

Signed and Sealed this

Twenty-first Day of September 1982

[SEAL]

Attest:

Attesting Officer

GERALD J. MOSSINGHOFF

Commissioner of Patents and Trademarks